US005554216A

United States Patent [19]

Baidins et al.

[11] Patent Number: 5,554,216
[45] Date of Patent: Sep. 10, 1996

[54] HIGH GLOSS DURABLE $TiO_2$ PIGMENT

[75] Inventors: Andrejs Baidins; Michael P. Diebold, both of Wilmington, Del.

[73] Assignee: E. I. Du Pont de Nemours and Company, Wilmington, Del.

[21] Appl. No.: 356,760

[22] Filed: Dec. 15, 1994

Related U.S. Application Data

[63] Continuation-in-part of Ser. No. 261,084, Jun. 16, 1994, abandoned, which is a continuation of Ser. No. 65,043, May 24, 1993, abandoned, which is a continuation of Ser. No. 841,809, Feb. 26, 1992, abandoned.

[51] Int. Cl.⁶ ............................................. C09C 1/36
[52] U.S. Cl. .......................... 106/442; 106/436; 106/439; 106/479; 106/409; 427/203; 427/218; 428/403; 428/404
[58] Field of Search ..................... 106/400, 436, 106/437, 438, 439, 442, 479, 409, 903; 427/203, 218; 428/403, 404

[56] References Cited

U.S. PATENT DOCUMENTS

| 3,726,694 | 4/1973 | Moore | 106/438 |
| 4,017,315 | 4/1977 | Vukasovich | 106/479 |
| 4,052,223 | 10/1977 | Howard | 106/438 |
| 4,179,306 | 12/1979 | Woditsh | 106/438 |
| 4,405,376 | 9/1983 | Matsunaga | 106/438 |
| 4,416,699 | 11/1983 | Jacobson | 106/442 |
| 5,002,608 | 3/1991 | Fujiwara | 106/437 |

FOREIGN PATENT DOCUMENTS 1367099 9/1974 United Kingdom.

*Primary Examiner*—Mark L. Bell
*Assistant Examiner*—Michael Marcheschi

[57] ABSTRACT

A coated $TiO_2$ pigment is disclosed with coatings of porous alumina and dense alumina, such dense alumina being formed in the presence of soluble molybdate.

9 Claims, No Drawings

HIGH GLOSS DURABLE TiO$_2$ PIGMENT

CROSS-REFERENCE TO RELATED APPLICATIONS

This application is a continuation-in-part of U.S. patent application Ser. No. 08/261,084 filed Jun. 16, 1994; which is a continuation of U.S. patent application Ser. No. 08/065,043 filed May 24, 1993; which is a continuation of U.S. patent application Ser. No. 07/841,809 filed Feb. 26, 1992. Such predecessor continuation applications to this application are now abandoned.

BACKGROUND OF THE INVENTION

1. Field of the Invention

This invention relates to a TiO$_2$ pigment with a porous coating of alumina and a dense coating of alumina, such dense coating being formed in the presence of soluble molybdate. It is suitable for applications requiring a combination of high gloss and good durability. This invention also relates to a process for preparing such coated TiO$_2$ pigment.

Treatment of TiO$_2$ pigment with hydrous oxides, especially silica and alumina, is known to provide good dispersion and durability, or resistance to chalking, in paints. TiO$_2$ pigments with a silica coating have good durability but tend to be inadequate in applications requiring high gloss, for example, automobiles and household appliances.

This invention provides for a TiO$_2$ pigment coated in such a way as to combine good durability with high gloss.

2. Description of the Prior Art

U.S. Pat. No. 4,052,223 discloses a process for producing a durable TiO$_2$ pigment which is coated with a phosphate, a silicate, and hydrous oxides of zirconium and aluminum, in carefully controlled amounts and order of deposition.

U.S. Pat. No. 4,405,376 discloses a TiO$_2$ pigment with good durability and dispersibility, having an inner coating of hydrous oxides of tin and zirconium, and an outer coating of hydrous alumina; and a process for producing the pigment.

SUMMARY OF THE INVENTION

In accordance with this invention there is provided:

A coated pigment consisting essentially of:

(a) a TiO$_2$ particle core;

(b) a porous coating of about 0.2 to 5% by weight of alumina, calculated as Al$_2$O$_3$ and based on the weight of the TiO$_2$; and (c) a dense coating of:
  (i) about 0.001-3% by weight of molybdena, calculated as MoO$_3$ and based on the weight of the TiO$_2$; and
  (ii) about 0.05% to 5% of alumina, calculated as Al$_2$O$_3$ and based on the weight of the TiO$_2$, said dense alumina coating being formed in aqueous media in the presence of an effective amount of soluble molybdate.

This invention also provides a coated pigment consisting essentially of:

(a) a TiO$_2$ particle core;

(b) a porous coating of about 0.5% to 5% by weight of alumina, calculated as Al$_2$O$_3$ and based on the weight of the TiO$_2$; and (c) a dense coating of:
  (i) about 0–3% by weight of molybdena, calculated as MoO$_3$ and based on the weight of the TiO$_2$; and
  (ii) about 0.05% to 5% of alumina, calculated as Al$_2$O$_3$ and based on the weight of the TiO2, said dense alumina coating being formed in aqueous media in the presence of an effective amount of soluble molybdate.

There is also provided a process for preparing a coated pigment comprising the steps of (a) precipitating on the TiO$_2$, in aqueous media, porous alumina in the amount of about 0.5–5% by weight, calculated as Al$_2$O$_3$ and based on the weight of the TiO$_2$, (b) precipitating on the TiO$_2$, in aqueous media, dense alumina, in the amount of about 0.05–5% by weight, based on the weight of the TiO$_2$, and calculated as Al$_2$O$_3$, the precipitation of the dense alumina taking place in the presence of an effective amount of soluble molybdate, wherein, a coated TiO$_2$ is formed and wherein, in said process, the sequence of said steps (a) and (b) can be first step (a) and then step (b) or first step (b) and then step (a), and (c) recovering the coated TiO$_2$ from the aqueous media.

DETAILED DESCRIPTION OF THE INVENTION

This invention relates to pigment particles that are primarily titanium dioxide but which have been treated in order to obtain improved gloss and durability characteristics. The core of the pigment is particulate TiO$_2$ and the TiO$_2$ can be prepared by any of several well-known methods including high temperature vapor phase oxidation of titanium tetrachloride, vapor phase hydrolysis of titanium tetrachloride, hydrolysis of colloidally seeded sulfuric acid solutions of titaniferous raw materials such as ilmenite, and the like. Such processes are well-known in the prior art.

Because the pigment of this invention is to be used in applications requiring high gloss, the size of the initial titanium dioxide core particles should not exceed one micron with the average preferably falling between 0.15 and 0.25 micron.

Coatings to be applied by the process of this invention to the core particles of titanium dioxide are applied by precipitation in aqueous slurries of the core titanium dioxide particles.

The coatings applied to the core particles in accordance with this invention are either porous or dense. The porous coating consists essentially of alumina and is obtained by precipitating a soluble aluminate in the presence of the core particles. By "soluble aluminate" is meant alkali metal salts of aluminate anions, for example, sodium or potassium aluminate. The soluble aluminates are generally dissolved at a pH of greater than 10 and are precipitated at a pH of less than 10 and preferably 7.5 to 9.5.

It has been found that the porous coating should constitute from about 0.5 to 5% by weight alumina (Al$_2$O$_3$), based on the weight of the core titanium dioxide particles. Less than about 0.5% can cause poor dispersibility of the pigment in paint formulations and an amount of porous coating greater than about 10% can cause gloss degradation. Because substantially all of the alumina that is precipitated finds its way to a coating on the core particles, it typically is only necessary to provide that amount of soluble aluminate to the slurry liquid which will result, after precipitation, in the appropriate degree of coating.

The alumina for the dense coating is obtained from a cationic source of alumina. The term "cationic source of alumina" refers to aluminum compounds that dissolve in water to yield an acidic solution. Examples include aluminum sulfate, aluminum chloride, aluminum fluoride, basic aluminum chloride, and the like.

The alumina for the dense coating is precipitated in the presence of an effective amount of soluble molybdate. While not wanting to be bound to any particular theory, it is believed that the presence of the soluble molybdate while the dense alumina is precipitated enhances the benefits obtained by this invention, i.e., an excellent combination of durability and gloss.

After the layers of dense alumina and porous alumina are formed, the resulting coated $TiO_2$ pigment can be recovered, including, preferably, washing with water. Because the molybdate is quite soluble, all or essentially all of it can be washed away. Often, after washing, the molybdate will be present in an amount of about 0–3, preferably about 0–1.5, and most preferably about 0.001–1 percent by weight, calculated as $MoO_3$ and based on the weight of the $TiO_2$.

By "effective amount" of soluble molybdate is meant an amount thereof that will provide the desired properties to the final coated $TiO_2$. While amounts up to ten percent by weight or more can be used, this ordinarily is not necessary because all or most of it can be washed out after formation of the dense and porous alumina coatings. Often, there will be used about 0.001–5, preferably about 0.01–3 percent, and most preferably about 0.01–1.5 percent by weight, calculated as $MoO_3$, and based on the weight of the $TiO_2$.

The molybdena and alumina precursors for the dense coating are dissolved at pH's from 1 to about 4.5 (for the alumina precursors) and 2 to 9.5 (for the molybdenum oxide precursors) and are precipitated at pH's from about 5 to 10. If both precursor solutions are at pH below 4.5 they can be combined prior to use. Alternatively, these solutions may be added sequentially to the slurry.

Preferably, after precipitation of the dense coating, the slurry is heated to at least about 70° C. and the pH of that slurry is adjusted to about 6 to 10 to assure complete precipitation of the coating materials.

For the purposes of this invention, it should be understood that, by the terms alumina, molybdena, $Al_2O_3$ and $MoO_3$ are meant the hydrous oxides of aluminum and molybdenum. Further, coatings which are described as mixtures of $Al_2O_3$ and $MoO_3$ may consist of either a mixture of separate phases of the two pure hydrous oxides or a single phase or set of phases composed of both oxides. Because of the variable water content of the hydrous oxides, all compositions are calculated based on the anhydrous oxides, although in reality no anhydrous oxides are necessarily present. In fact, all alumina and molybdena with which this invention are concerned are hydrous, that is, take the form $Al_2O_3 \cdot nH_2O$ and $MoO_3 \cdot H_2O$.

Eligible aluminates are sodium aluminate, potassium aluminate, and the like.

Eligible molybdates are sodium molybdates, ammonium molybdates, potassium molybdates, molybdic acid, and the like.

Preferably, the process of this invention, through the steps of adding all coating materials to be precipitated, is conducted at about room temperature or perhaps as high as 90° C. After all coating materials have been added to the slurry, preferably the pH is adjusted and the temperature is increased to 60° to 100° C. and more preferably at least 70° C. After the increase in temperature and adjustment of the pH, the slurry preferably is stirred for an additional time, for example, as much as 30 minutes, to assure that precipitation has been completed. After precipitation has been completed, the resulting coated pigment is separated from the slurry liquid and dried or further processed as is common with titanium dioxide pigments. Optionally, after step (b), the aqueous media is maintained and agitated, at a temperature of about 60–100 degrees C., and at a pH of about 6–10 for at least 5 minutes.

In the foregoing description, the dense molybdena and alumina combination coating was applied directly to the titanium dioxide core followed by application of the outer porous coating of alumina. The present invention also provides for application of the porous alumina coating directly to the titanium dioxide core with the dense coating of molybdena and alumina then being applied over the porous coating. The dense coating, thus applied, is believed to find its way both on and in the porous coating.

This process may be applied to pigments that have been previously treated with oxides such as titania, but their presence is not essential to the benefits herein obtained. The deposition of a porous coating of alumina may be omitted if finished $TiO_2$ pigment with such a coating is used in place of base $TiO_2$ pigment as starting material.

After or in the treatment according to this process, the pigment is recovered by known procedures including filtration, washing, drying, sieving, and dry grinding such as micronizing.

The product of this invention can be prepared by applying a porous alumina coating onto starting particles having a core of titanium dioxide and dense coating of alumina formed in the presence a soluble molybdate or it can be made by applying a dense coating of alumina to a slurry of particles of a core of titanium dioxide having a porous coating of alumina.

In the examples which follow, the test results were obtained by the procedures described below.

DURABILITY

Durability of a pigment is usually measured as resistance to chalking in long-term (for example, 2 years) outdoor exposure tests of paints containing the pigment. Chalk/fade degradation of exterior paints containing $TiO_2$ pigments is partly attributed to catalytic action of the $TiO_2$ surface in oxidation of the organic binder in the presence of ultraviolet radiation, oxygen, and water vapor (H. B. Clark, "Titanium Dioxide Pigments", Treatise on Coatings, Vol. 3, Pigments, Marcel Dekker, 1975). In the following examples, the ultraviolet reactivity of $TiO_2$ pigments is measured by the above method.

GLOSS

The comparative effect of a $TiO_2$ pigment on gloss of a paint layer is determined by preparing paints with the dry pigment and with pigment standards. Pigment samples are dispersed in an alkyd vehicle and the dispersion is sand-milled and reduced with resins to spray consistency. Aluminum panels are spray painted using automatic spraying equipment under controlled conditions to produce uniform film thickness and surface characteristics. The paint films are then baked. Finally, gloss is determined by measuring 20 degree reflectance of the panels with a Hunterlab D-48-7 glossmeter and calculating gloss in relation to reflectance values of the standards.

DESCRIPTION OF THE PREFERRED EMBODIMENTS

The invention will be better understood by reference to the following illustrative examples. Properties of the pigments prepared as in the examples, and those of several commercial pigments, for comparison, are shown in the Table. All percentages are on a weight basis.

EXAMPLE 1

To a rapidly stirred slurry of 4000 grams of $TiO_2$ particles in 8 liters of water, 235 g $AlCl_3$ and a solution of 50 grams of $Na_2MoO_4 \cdot 2H_2O$ in 100 ml of water were added. The slurry pH was adjusted to 9.5 using NaOH. After the slurry was stirred at room temperature for 30 minutes, the temperature was raised to 70° C. and pH was lowered to 8.5; and 95 ml of an aqueous solution of $NaAlO_2$, of concentration equivalent to 420 grams/liter $Al_2O_3$, and 75 ml of concentrated HCl were added to the slurry, simultaneously. The pH was held at 8.5, using either HCl or NaOH to correct for any pH change, and the slurry was stirred for 30 minutes. The pigment was filtered, washed, and dried overnight at 120° C. The dry pigment was screened through a 12 mesh sieve, then ground twice in an 8 inch micronizer.

EXAMPLE 2

A rapidly stirred slurry of 4000 grams of $TiO_2$ particles in 8 liters of water was heated to 70° C., after which 29 g aluminum sulfate hydrate and a solution of 25 grams of $Na_2MoO_4 \cdot 2H_2O$ in 50 ml of water were added. The slurry pH was adjusted to 9.5 using NaOH. After the slurry was stirred at 70° C. for 30 minutes, the pH was lowered to 8.5 using concentrated HCl and 285 ml of an aqueous solution of $NaAlO_2$, of concentration equivalent to 420 grams/liter $Al_2O_3$, and 225 ml of concentrated HCl were added to the slurry, simultaneously. The pH was held at 8.5, using either HCl or NaOH to correct for any pH change, and the slurry was stirred for 30 minutes. The pigment was filtered, washed, and dried overnight at 120° C. The dry pigment was screened through a 12 mesh sieve, then ground twice in a 8 inch micronizer.

EXAMPLE 3

To a rapidly stirred slurry of 4000 grams of $TiO_2$ particles in 8 liters of water, 40 g $AlCl_3$ and a solution of 8 grams of $Na_2MoO_4 \cdot 2H_2O$ in 20 ml of water were added. The slurry pH was adjusted to 6.0 using NaOH. After the slurry was stirred at room temperature for 30 minutes, the temperature was raised to 70° C. and pH was raised to 8.5; and 285 ml of an aqueous solution of $NaAlO_2$, of concentration equivalent to 420 grams/liter $Al_2O_3$, and 225 ml of concentrated HCl were added to the slurry, simultaneously. The pH was held at 8.5, using either HCl or NaOH to correct for any pH change, and the slurry was stirred to 30 minutes. The pigment was filtered, washed, and dried overnight at 120° C. The dry pigment was screened through a 12 mesh sieve, then ground twice in an 8 inch micronizer.

EXAMPLE 4

This was the same as Example 3, except that 87 g aluminum sulfate hydrate was used in place of the $AlCl_3$.

EXAMPLE 5

This was the same as Example 3, except that 45 ml of a 50 weight percent aqueous solution of basic aluminum chloride (approximately $Al_2(OH)_5Cl$) was used in place of the $AlCl_3$.

EXAMPLE 6

This was the same a Example 3, except that 45 ml of basic aluminum chloride (50 weight percent aqueous solution) was used in place of the $AlCl_3$ and the slurry was heated to 50° C. prior to addition of any other chemicals and was held at this temperature until raised to 70° C. prior to addition of the sodium aluminate solution and concentrated HCl.

TABLE

| Example | Coating Composition % | | | Durability (Chalk/Fade - Months) | Gloss |
| --- | --- | --- | --- | --- | --- |
| | Dense | | Porous | | |
| | Al2O3 | MoO3 | Al2O3 | | |
| 1 | 2.25 | 0.75 | 1 | 32 | 79 |
| 2 | 0.12 | 0.38 | 3 | 31 | 81 |
| 3 | 0.38 | 0.12 | 3 | 36 | 79 |
| 4 | 0.38 | 0.12 | 3 | 34 | 80 |
| 5 | 0.38 | 0.12 | 2 | 33 | 80 |
| 6 | 0.38 | 0.12 | 3 | 31 | 79 |
| R-900 | none | | 3 | 10 | 79 |
| R-902 | 1.5 SiO2 | | 3 | 20 | 69 |
| R-960 | 6.5 SiO2 | | 2 | 35 | 66 |
| CR-97 | 0.5 ZrO2 + 0.35 SnO2 | | 2 | 31 | 81 |
| R-TC60 | 1.0 ZrO2 | | 3 | 27 | 76 |

The examples identified as R-900, R-902 and R-960, above, represent values for titanium dioxide pigment products presently offered for sale by E. I. du Pont de Nemours and Company under those trade designations. The example identified as CR-97, above, represents values for titanium dioxide pigment presently offered for sale by Ishihara Sangyo Kaisha, Ltd. under that trade designation. The example identified as R-TC60, above, represents values for titanium dioxide pigment presently offered for sale by Tioxide Group, PLC under that trade designation. They are presented as comparisons with the product of this invention.

We claim:

1. A coated pigment consisting essentially of:
   (a) a $TiO_2$ particle core;
   (b) a porous coating of about 0.2 to 5% by weight of alumina, calculated as $Al_2O_3$ and based on the weight of the $TiO_2$; and
   (c) a dense coating of:
      (i) about 0.001–3% by weight of molybdena, calculated as $MoO_3$ and based on the weight of the $TiO_2$; and
      (ii) about 0.05% to 5% of alumina, calculated as $Al_2O_3$ and based on the weight of the $TiO_2$, said dense alumina coating being formed in aqueous media in the presence of an effective amount of soluble molybdate.

2. The coated pigment of claim 1 wherein the alumina in the dense coating is about 0.05% to 3% by weight calculated as $Al_2O_3$ and based on the weight of the $TiO_2$.

3. The coated pigment of claim 2 wherein the molybdena in the dense coating is about 0.001 to 1.5% by weight calculated as $MoO_3$ and based on the weight of the $TiO_2$.

4. The coated pigment of claim 1 wherein the alumina in the porous coating is about 0.5 to 5% by weight calculated as $Al_2O_3$ and based on the weight of the $TiO_2$.

5. The coated pigment of claim 1 wherein the dense coating is about 0.5% by Weight alumina and about 0.001–1% by weight molybdena, and the porous coating is about 3% by weight alumina all based on the weight of the $TiO_2$.

6. The coated pigment of claim 1 wherein the dense coating is directly on the particle core and the porous coating is on the dense coating.

7. Process for preparing a coated $TiO_2$ pigment comprising:
   (a) precipitating on the $TiO_2$, in aqueous media, porous alumina in the amount of about 0.5–5% by weight, calculated as $Al_2O_3$ and based on the weight of the $TiO_2$,
   (b) precipitating on the $TiO_2$, in aqueous media, dense alumina, in the amount of about 0.05–5% by weight, based on the weight of the $TiO_2$, and calculated as $Al_2O_3$, the precipitation of the dense alumina taking place in the presence of an effective amount of soluble molybdate, wherein, a coated $TiO_2$ is formed and wherein, in said process, the sequence of said steps (a) and (b) can be first step (a) and then step (b) or first step (b) and then step (a), and 8. The process of claim 7 wherein:
   - steps (a) and (b) have a pH of about 4–9.5
   - the amount of molybdate used in step (b) is about 0.05–3% by weight, calculated as $MoO_3$ mid based on the weight of $TiO_2$
   - optionally, after step (b), the aqueous media is maintained and agitated, at a temperature of about 60–100 degrees C., and at a pII of about 6–10 for at least about 5 minutes.

9. The process of any one of claims 7 or 8 wherein, in step (c), the recovering involves washing the coated $TiO_2$ with water until the molybdate content of the coating is about 0.01–1.5% by weight, calculated as $MoO_3$ and based on the weight of the $TiO_2$.

* * * * *